United States Patent
Lee et al.

(10) Patent No.: US 9,204,435 B2
(45) Date of Patent: *Dec. 1, 2015

(54) METHOD AND APPARATUS OF DOWNLINK SUBCHANNELIZATION IN WIRELESS COMMUNICATION SYSTEM

(71) Applicant: LG Electronics Inc., Seoul (KR)

(72) Inventors: Wook Bong Lee, Anyang-si (KR); Jin Young Chun, Anyang-si (KR); Han Gyu Cho, Anyang-si (KR); Jin Soo Choi, Anyang-si (KR); Bin Chul Ihm, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

This patent is subject to a terminal disclaimer.

(21) Appl. No.: 13/952,074

(22) Filed: Jul. 26, 2013

(65) Prior Publication Data

US 2013/0308584 A1    Nov. 21, 2013

Related U.S. Application Data

(63) Continuation of application No. 12/939,126, filed on Nov. 3, 2010, now Pat. No. 8,520,618.

(60) Provisional application No. 61/258,197, filed on Nov. 5, 2009, provisional application No. 61/258,594, filed (Continued)

(30) Foreign Application Priority Data

Oct. 26, 2010    (KR) .................. 10-2010-0104670

(51) Int. Cl.
*H04L 5/00*    (2006.01)
*H04W 72/04*    (2009.01)
*H04J 11/00*    (2006.01)

(52) U.S. Cl.
CPC ............. *H04W 72/042* (2013.01); *H04L 5/003* (2013.01); *H04L 5/0035* (2013.01); *H04L 5/0073* (2013.01); *H04W 72/0453* (2013.01); *H04J 11/0056* (2013.01)

(58) Field of Classification Search
None
See application file for complete search history.

(56) References Cited

U.S. PATENT DOCUMENTS 8,520,618 B2    8/2013   Lee et al.
8,665,697 B1 *  3/2014   Venugopalan et al. ....... 370/210

(Continued)

FOREIGN PATENT DOCUMENTS

CN        101296475       10/2008
KR     10-2009-0048354      5/2009

(Continued)

OTHER PUBLICATIONS

"Central Processing Unit." Pfaffenberger, Bryan. Webster's New World Computer Dictionary, Ninth Edition. New York: Hungry Minds, Inc., 2001, Print.*

(Continued)

*Primary Examiner* — Andrew Chriss
*Assistant Examiner* — Joshua A Kading
(74) *Attorney, Agent, or Firm* — Lee, Hong, Degerman, Kang & Waimey

(57) ABSTRACT

A method of downlink subchannelization in a wireless communication system includes: transmitting a network entry and network discovery information including an open loop (OL) region parameter; and mapping a physical resource unit (PRU) to a contiguous resource unit (CRU) or a distributed resource unit (DRU) with respect to ith frequency partition based on the OL region parameter, wherein a permutation sequence used for mapping a PRU of the ith frequency partition ($PRU_{FPi}$) to a CRU of the ith frequency partition ($CRU_{FPi}$) or a DRU of the ith frequency partition ($DRU_{FPi}$) is determined by a seed value, and the seed value is set to be a particular value according to the value of the OL region parameter.

24 Claims, 10 Drawing Sheets

Related U.S. Application Data on Nov. 6, 2009, provisional application No. 61/261,687, filed on Nov. 16, 2009, provisional application No. 61/262,495, filed on Nov. 18, 2009, provisional application No. 61/262,529, filed on Nov. 18, 2009, provisional application No. 61/267,450, filed on Dec. 8, 2009.

(56) References Cited

U.S. PATENT DOCUMENTS

| | | |
|---|---|---|
| 2010/0103895 A1 | 4/2010 | Cho et al. |
| 2010/0110874 A1 | 5/2010 | Kang et al. |
| 2010/0166087 A1* | 7/2010 | Lomnitz ............. 375/260 |
| 2010/0169400 A1 | 7/2010 | Yang et al. |
| 2010/0189047 A1 | 7/2010 | Baum et al. |
| 2011/0141876 A1* | 6/2011 | Kuchi et al. ............. 370/203 |
| 2011/0249644 A1 | 10/2011 | Boariu et al. |

FOREIGN PATENT DOCUMENTS

| | | |
|---|---|---|
| KR | 1020090048354 | 5/2009 |
| KR | 1020090059064 | 6/2009 |
| KR | 1020090111273 | 10/2009 |
| WO | 2009/072842 | 6/2009 |
| WO | 2009/131329 | 10/2009 |

OTHER PUBLICATIONS

Intellectual Property Corporation of Malaysia Application Serial No. PI2012001990, Office Action dated May 15, 2014, 3 pages.

The State Intellectual Property Office of the People's Republic of China Application Serial No. 201080050165.X, Office Action dated May 6, 2014, 5 pages.

Part 16: Air Interface for Fixed and Mobile Broadband Wireless Access Systems, Advanced Air Interface (working document), IEEE WirelessMan 802.16m-09/0010rla, Jun. 2009, 33 pages.

* cited by examiner

METHOD AND APPARATUS OF DOWNLINK SUBCHANNELIZATION IN WIRELESS COMMUNICATION SYSTEM

CROSS-REFERENCE TO RELATED APPLICATIONS

This application is a continuation of U.S. patent application Ser. No. 12/939,126, filed Nov. 3, 2010, now U.S. Pat. No. 8,520,618, which pursuant to 35 U.S.C. §119, claims the benefit of earlier filing date and right of priority to Korean Application No. 10-2010-0104670, filed on Oct. 26, 2010, and also claims the benefit of U.S. Provisional Application Nos. 61/258,197 filed on Nov. 5, 2009, 61/258,594 filed on Nov. 6, 2009, 61/261,687 filed on Nov. 16, 2009, 61/262,495 filed on Nov. 18, 2009, 61/262,529 filed on Nov. 18, 2009, and 61/267,450 filed on Dec. 8, 2009, the contents of which are all incorporated by reference herein in their entirety.

BACKGROUND

1. Technical Field

The present invention relates to wireless communication and, more particularly, to a method and apparatus of downlink subchannelization in a wireless communication system.

2. Related Art

IEEE (Institute of Electrical and Electronics Engineers) 802.16e standards have been adapted in the name of 'WMAN-OFDMA TDD' as sixth standards for IMT (International Mobile Telecommunication)-2000 in ITU (International Telecommunication Union-affiliated ITU-R (ITU-Radio communication sector) in 2007. ITU-R is preparing an IMT-Advanced system as next-generation 4G mobile communication standards after IMT-2000. IEEE 802.16 WG (Working Group) has determined to promote an 802.16m project to aim at creating amendment standards of the existing IEEE 802.16e, as standards for the IMT-Advanced system in late 2006. As noted from the aim, 802.16m standards involve the continuity of the past 802.16e standards and the continuity of the futuristic next-generation IMT-Advanced system. Thus, 802.16m standards are required to satisfy the advanced requirements for the IMT-Advanced system while maintaining the compatibility with the 802.16e standard-based Mobile WiMAX system.

One of the systems considered in the next wireless communication generation is an OFDM (Orthogonal Frequency Division Multiplexing) system that can attenuate an inter-symbol interference (ISI) effect with low complexity. The OFDM converts serially input data symbols into N number of parallel data symbols, includes them in the N number of separated subcarriers, and transmits the same. The subcarriers maintain orthogonality in a frequency domain. Respective orthogonal channels experience mutually independent frequency selective fading, and the intervals of transmitted symbols are lengthened to thus minimize the inter-symbol interference. OFDMA (Orthogonal Frequency Division Multiple Access) refers to a multi-access scheme accomplishing multiple accesses by independently providing portions of available subcarriers to each user in a system using the OFDM as a modulation scheme. The OFDMA provides frequency resources called subcarriers to each user, and in general, the respective frequency resources are independently provided to multiple users so as not to overlap with each other. That is, resultantly, frequency resources are mutually exclusively allocated to the users.

In the OFDMA system, frequency diversity can be obtained for multiple users through frequency selective scheduling, and subcarriers can be allocated in various forms according to permutation with respect to the subcarriers. The efficiency of a space domain can be enhanced according to a space multiplexing scheme using multiple antennas.

Meanwhile, radio resources may be divided into a plurality of frequency partitions (FP) when a service such as a multi-cast and broadcast service is provided. This is called a fractional frequency reuse (FFR), and each of the frequency partitions can be used for each different purposes. In each of the frequency partitions, distributed subchannels and localized subchannels may coexist according to a frequency division multiplexing scheme. Also, subchannels may be allocated to the respective frequency partitions based on different resources units (or granularity).

A base station (BS) may use an open loop (OL) region. The OL region is a time frequency resource domain using the same number of pilot patterns and a given OL multi-input multi-output (MIMO) mode. The OL region is used to provide a stable interference environment. However, the OL region is classified into several types of regions according to the type of supported permutations, applied MIMO feedback modes, and the like. In order for the BS to use the OL region, resource units of each cell must be aligned. In this case, however, the existing subchannelization method has a problem in that some types of the OL region are not able to align corresponding resource units.

Thus, a method and an apparatus of downlink subchannelization for supporting any type of OL region is required.

SUMMARY

An aspect of the present invention provides a method and apparatus of downlink subchannelization in a wireless communication system.

According to an aspect of the present invention, a method of downlink subchannelization in a wireless communication system is provided. The method comprises transmitting a network entry and network discovery information including an open loop (OL) region parameter; and mapping a physical resource unit (PRU) to a contiguous resource unit (CRU) or a distributed resource unit (DRU) with respect to $i^{th}$ (i is 0 or natural number) frequency partition based on the OL region parameter, wherein a permutation sequence used for mapping a PRU of the $i^{th}$ frequency partition ($PRU_{FPi}$) to a CRU of the $i^{th}$ frequency partition ($CRU_{FPi}$) or a DRU of the $i^{th}$ frequency partition ($DRU_{FPi}$) is determined by a seed value, and the seed value is set to be a particular value according to the value of the OL region parameter.

According to other aspect of the present invention, a terminal of a wireless communication system is provided. The terminal comprises a processor; and an RF unit connected to the processor, wherein the processor receives network entry and network discovery information including an open loop (OL) region parameter, receives a downlink signal using a mapping relation which maps a physical resource unit (PRU) to a contiguous resource unit (CRU) or a distributed resource unit (DRU) with respect to ith frequency partition based on the OL region parameter, wherein a permutation sequence used for mapping a PRU of the ith frequency partition ($PRU_{FPi}$) to a CRU of the ith frequency partition ($CRU_{FPi}$) or a DRU of the ith frequency partition ($DRU_{FPi}$) is determined by a seed value, and the seed value is set to be a particular value according to the value of the OL region parameter.

DESCRIPTION OF EXEMPLARY EMBODIMENTS

The following technique may be used for various wireless communication systems such as CDMA (code division multiple access), FDMA (frequency division multiple access), TDMA (time division multiple access), OFDMA (orthogonal frequency division multiple access), SC-FDMA (single carrier-frequency division multiple access), and the like. CDMA may be implemented as a radio technology such as UTRA (Universal Terrestrial Radio Access) or CDMA2000. TDMA may be implemented as a radio technology such as GSM (Global System for Mobile communications)/GPRS (General Packet Radio Service)/EDGE (Enhanced Data Rates for GSM Evolution). OFDMA may be implemented as a radio technology such as IEEE 802.11 (Wi-Fi), IEEE 802.16 (WiMAX), IEEE 802-20, E-UTRA (Evolved UTRA), and the like. IEEE 802.16m is an evolution of IEEE 802.16e, providing backward compatibility with an IEEE 802.16e-based system. UTRA is a part of UMTS (Universal Mobile Telecommunications System). 3GPP (3rd Generation Partnership Project) LTE (long term evolution) is a part of E-UMTS (Evolved UMTS) using E-UTRA, which employs OFDMA for downlink and SC-FDMA for uplink. LTE-A (Advanced) is an evolution of 3GPP LTE.

To clarify the explanation, description will be made based on the IEEE 802.16m, but the technical feature of the present invention is not limited thereto.

Figure 1:
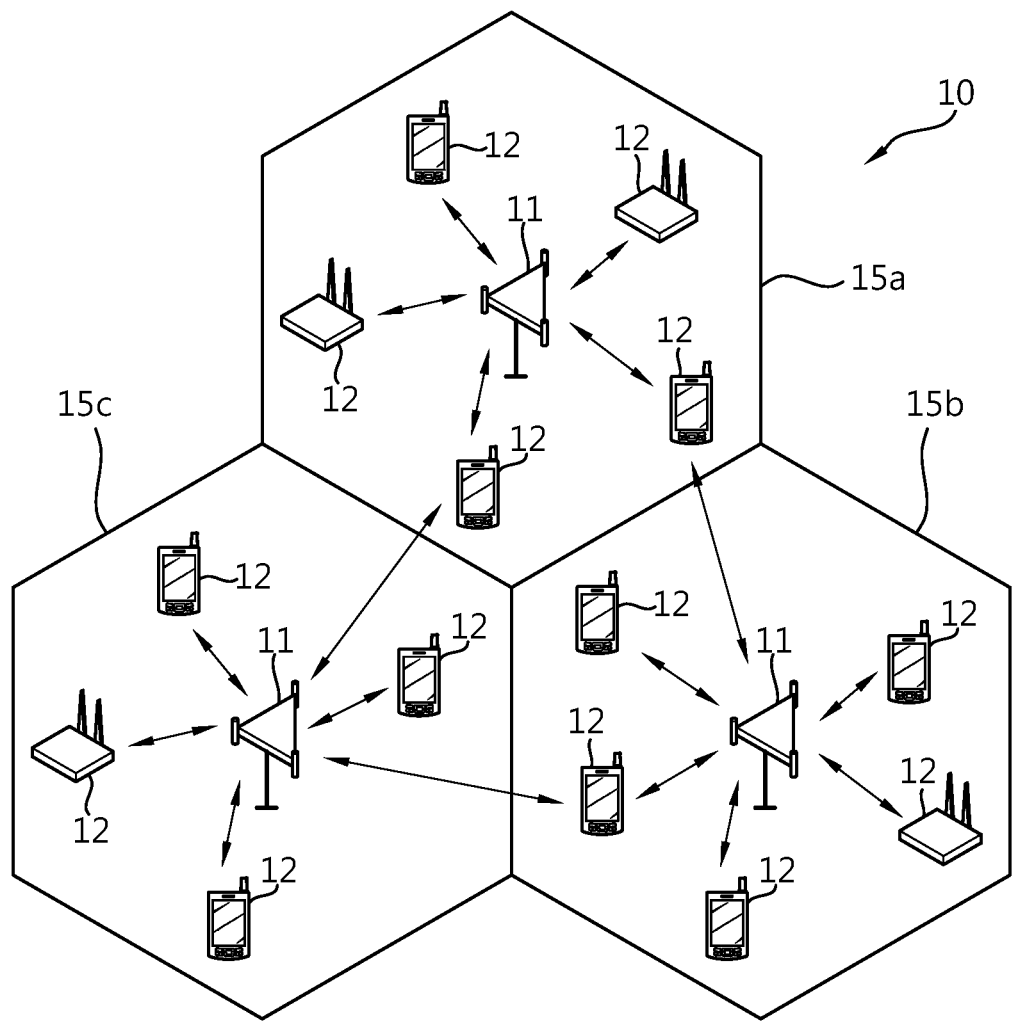
FIG. 1 illustrates a wireless communication system.

FIG. 1 illustrates a wireless communication system. The wireless communication 10 system is widely used to provide a variety of communication services such as communication of voice, packet data, etc.

Referring to FIG. 1, the wireless communication system 10 includes at least one base station (BS) 11. Each BS 11 provides a communication service to particular geographical areas (which are generally called cells) 15a, 15b, and 15c. Each of the cells may be divided into a plurality of areas (or sectors). A user equipment (UE) 12 may be fixed or mobile and may be referred to by other terminologies such as mobile station (MS), advanced MS (AMS), mobile terminal (MT), user terminal (UT), subscriber station (SS), wireless device, personal digital assistant (PDA), wireless modem, handheld device, etc. The BS 11 generally refers to a fixed station that communicates with the UE 12 and may be called by other terminologies such as advanced BS (ABS), evolved-nodeB (eNB), base transceiver system (BTS), access point (AP), etc.

A UE belongs to one cell, and the cell to which the UE belongs is called a serving cell, and a BS providing a communication service to the serving cell is called a serving BS. The wireless communication system is a cellular system, so there exists another cell adjacent to the serving cell. The another cell adjacent to the serving cell is called a neighbor cell. A BS providing a communication service to the neighbor cell is called a neighbor BS. The serving cell and the neighbor cell are relatively determined based on a UE.

This technique may be used for downlink or uplink. In general, downlink refers to communication from the BS 11 to the UE 12, and uplink refers to communication from the UE 12 to the BS 11. In the downlink, a transmitter may be a part of the BS 11, and a receiver may be a part of the UE 12. In the uplink, a transmitter may be a part of the UE 12, and a receiver may be a part of the BS 11.

Figure 2:
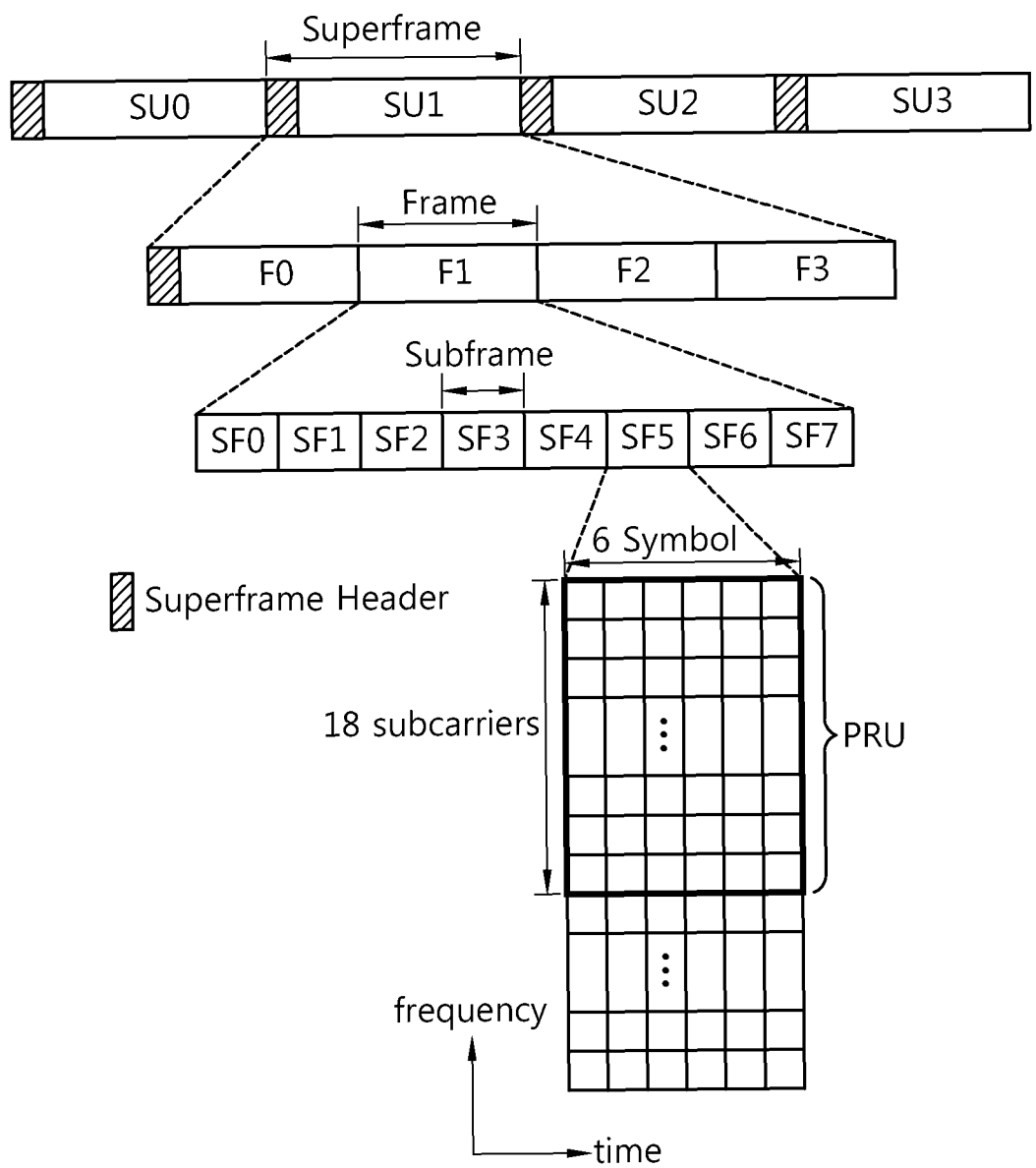
FIG. 2 illustrates an example of the structure of a superframe.

FIG. 2 illustrates an example of the structure of a superframe.

Referring to FIG. 2, a superframe (SU1) includes a superframe header (SFH) and four frames (F0, F1, F2, and F3). The lengths of the respective frames of the superframe may be equal. It is illustrated that each superframe has a size of 20 ms and each frame has a size of 5 ms, but the present invention is not limited thereto. The length of the superframe, the number of frames included in the superframe, the number of subframes included in each frame may be changed variably. The number of subframes included in each frame may be changed variably depending on a channel bandwidth and the length of a cyclic prefix (CP).

The superframe header may carry an essential system parameter and system configuration information. The superframe header may be positioned in a first subframe within the superframe. For example, the superframe header may occupy last five OFDMA symbols of the first subframe. The superframe header may be classified into a primary SFH (P-SFH) and a secondary SFH (S-SFH). The P-SFH and the S-SFH may be transmitted in every superframe. The S-SFH may be transmitted in two contiguous superframes. Information transmitted in the S-SFH may be divided into three subpackets of S-SFH SP1, S-SFH SP2 and S-SFH SP3. Respective subpackets may be periodically transmitted at different periods. The importance of the information transmitted through S-SFH SP1, S-SFH SP2, and S-SFH SP3 may differ, and S-SFH SP1 may be transmitted at the shortest period, and S-SFH SP3 may be transmitted at the longest period. S-SFH SP1 includes information regarding a network re-entry. S-SFH SP2 includes information regarding a network entry and a network discovery. S-SFH SP3 may include remaining important system information.

One frame includes a plurality of subframes SF0, SF1, SF2, SF3, SF4, SF5, SF6, and SF7. Each subframe may be used for an uplink or downlink transmission. One subframe includes a plurality of OFDM (orthogonal frequency division multiplexing) symbols in a time domain, and includes a plurality of subcarriers in a frequency domain. The OFDM symbol is to express one symbol period and may be called by other names such as OFDMA symbol, SC-FDMA symbol, and the like, according to a multi-access scheme. A subframe may include five, six, seven, or nine OFDM symbols, but this is merely illustrative and the number of OFDM symbols is not limited. The number of OFDM symbols included in a subframe may be changed variably according to a channel bandwidth and a CP length. The type of a subframe may be defined according to the number of OFDM symbols included in a subframe. For example, a type-1 subframe may be defined to include six OFDM symbols, a type-2 subframe may be defined to include seven OFDM symbols, a type-3 subframe may be defined to include five OFDM symbols, and a type-4 subframe may be defined to include nine OFDM symbols. One frame may include all the same type of subframes. Or, one frame may include different types of subframes. Namely, the number of OFDM symbols included in each subframe of one frame may be all the same or different. Or, the number of OFDM symbols of at least one subframe of one frame may be different from the number of OFDM symbols of the other remaining subframes of the frame.

A TDD (Time Division Duplexing) scheme or an FDD (Frequency Division Duplexing) scheme may be applied to a frame. In the TDD scheme, each frame is used for an uplink transmission or a downlink transmission at a different time at the same frequency. Namely, subframes of frame according to the TDD scheme are divided into uplink subframes and downlink subframes in a time domain. In the FDD scheme, the respective subframes are used for an uplink transmission or downlink transmission at different frequencies of the same time. Namely, subframes of a frame according to the FDD scheme are divided into uplink subframes and downlink subframes in a frequency domain. The uplink transmission and the downlink transmission may occupy different frequency bands and may be simultaneously performed.

A subframe includes a plurality of physical resource units (PRUs) in the frequency domain. The PRU is a basic physical unit for a resource allocation, including a plurality of consecutive OFDM symbols in the time domain and a plurality of consecutive subcarriers in the frequency domain. The number of OFDM symbols included in the PRU may be equal to the number of OFDM symbols included in one subframe. Thus, the number of OFDM symbols of a PRU may be determined depending on the type of a subframe. For example, when one subframe includes six OFDM symbols, the PRU may be defined as eighteen subcarriers and six OFDM symbols.

A logical resource unit (LRU) is a basic logical unit for a distributed resource allocation or a contiguous resource allocation. The LRU is defined by a plurality of OFDM symbols and a plurality of subcarriers. The LRU includes pilots used in a PRU. Thus, an appropriate number of subcarriers of one LRU is dependent upon the number of allocated pilots.

A distributed resource unit (DRU) may be used to obtain a frequency diversity gain. A DRU includes a subcarrier group distributed in one frequency partition. The size of the DRU is equal to that of a PRU. A minimum unit for forming a DRU is a single subcarrier. A distributed logical resource unit (DLRU) can be obtained by performing subcarrier permutation on the DRU.

A contiguous resource unit (CRU) may be used to obtain a frequency selective scheduling gain. The CRU includes a local subcarrier group. The size of the CRU is equal to that of a PRU. A contiguous logical resource unit (CLRU) may be obtained by directly mapping the CRU.

Meanwhile, a fractional frequency reuse (FFR) scheme may be used in a cellular system in which multiple cells exist. The FFR scheme is a scheme of dividing an overall frequency band into a plurality of frequency partitions (FPs) and allocating an FP to each cell (or sector). Through the FFR scheme, different frequency partitions are allocated to neighbor cells, and the same frequency partition may be allocated to cells which are remote from each other. Thus, an inter-cell interface (ICI) can be reduced and the performance of a UE at a cell edge can be increased.

Figure 3:
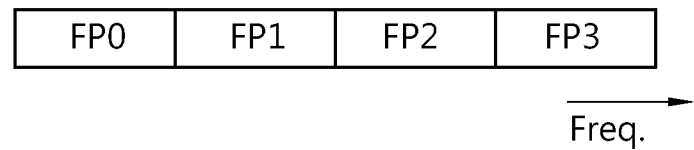
FIG. 3 illustrates an example of a method for dividing an overall frequency band into a plurality of frequency partitions.

FIG. 3 illustrates an example of a method for dividing an overall frequency band into a plurality of frequency partitions.

Referring to FIG. 3, the overall frequency band is divided into a first frequency partition FP0, a second frequency partition FP1, a third frequency partition FP2, and a fourth frequency partition FP3. Each of the frequency partitions may be divided logically and/or physically in the overall frequency band.

Figure 4:
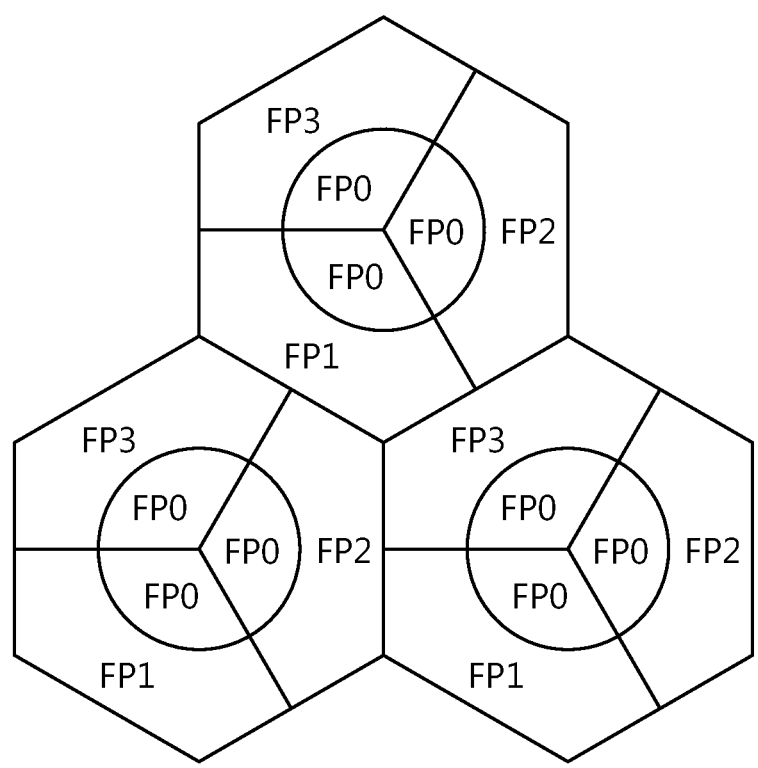
FIG. 4 illustrates an example of a cellular system using an FFR scheme.

FIG. 4 illustrates an example of a cellular system using an FFR scheme.

Referring to FIG. 4, each cell is divided into an inner cell and a cell edge. Also, each cell is divided into three sectors. The overall frequency band is divided into three frequency partitions FP1, FP2, and FP3, and it is assumed that the first frequency partition FP0 is the sum of the second frequency partition FP1, the third frequency partition FP2, and the fourth frequency partition FP3. Namely, the first frequency partition FP0 is equal to the overall frequency band.

The first frequency partition FP0 is allocated to the inner cell. Any one of the second to fourth frequency partitions FP1 to FP3 is allocated to each sector of the cell edge. In this case, different frequency partitions are allocated to neighbor cells. Hereinafter, an allocated frequency partition is called an active frequency partition, and a non-allocated frequency partition is called an inactive frequency partition. For example, when the second frequency partition FP1 is allocated, the second frequency partition is an active frequency partition, and the third and fourth frequency partitions FP2 and FP3 are inactive frequency partitions.

A frequency reuse factor (FRF) may be defined as a factor that how many cells (or sectors) the overall frequency band can be divided. In the above example, the FRF of the inner cell may be 1, and that of each sector of the cell edge may be 3.

Figure 5:
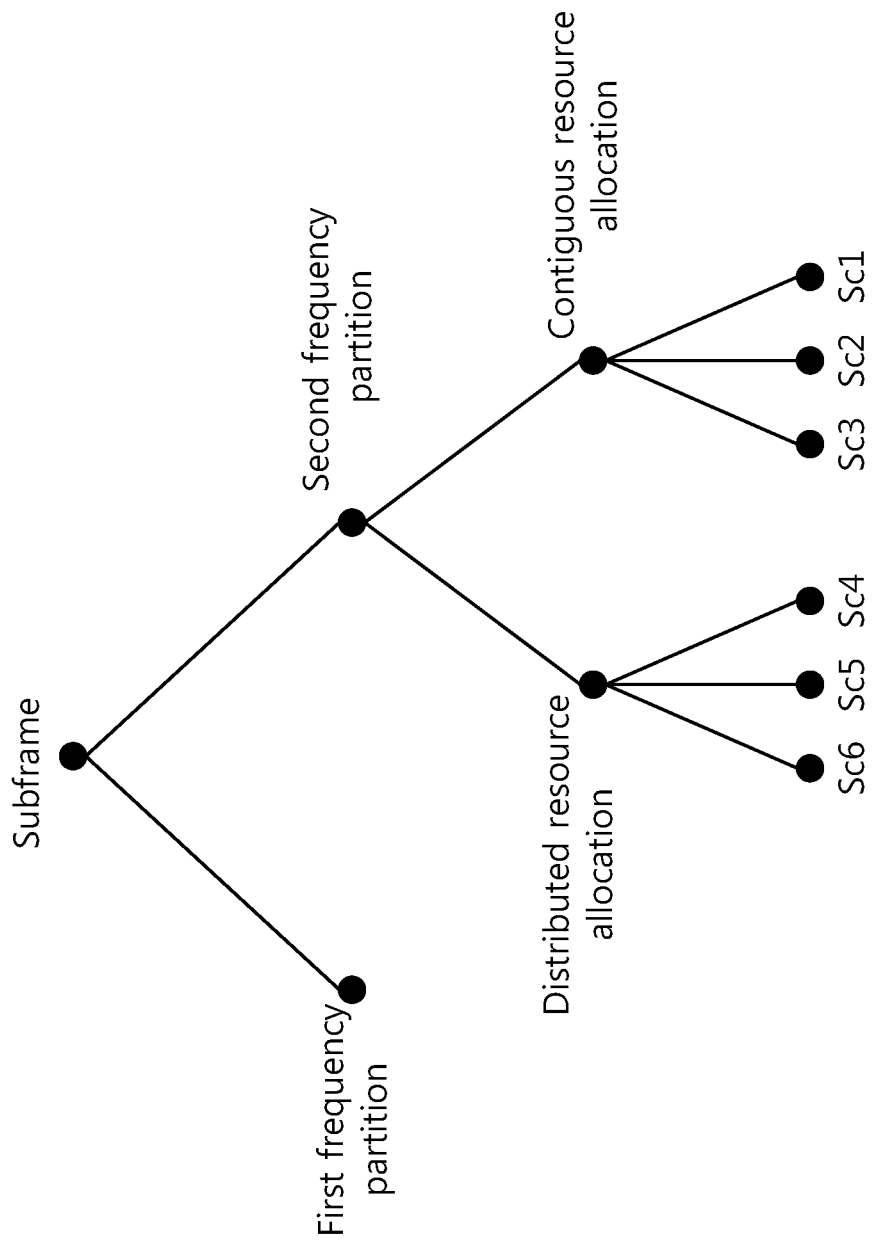
FIG. 5 illustrates an example of the structure of a downlink resource.

FIG. 5 illustrates an example of the structure of a downlink resource.

Referring to FIG. 5, a downlink subframe may be divided into at least one frequency partition. Here, it is illustrated that the subframe is divided into two frequency partitions FP1 (first frequency partition) and FP2 (second frequency partition), but the number of frequency partitions of the subframe is not limited thereto. The respective frequency partitions may be used for different purposes, like the FFR.

Each of the frequency partitions includes at least one PRU. Each of the frequency partitions may include a distributed resource allocation and/or contiguous resource allocation. Here, the second frequency partition FP2 includes the distributed resource allocation and the contiguous resource allocation. 'Sc' (Sc1 to Sc6) refers to subcarrier.

Meanwhile, radio resources may be subchannelized and divided into several subchannels as necessary. The subchannels may include distributed subchannels and contiguous subchannels. The distributed subchannels may be the DLRU, and the contiguous subchannels may be CLRU. Subcarriers of the LRU can spread over the entire bandwidth through subchannelization.

In order to apply subchannelization, the following matters shall be considered.

Figure 6:
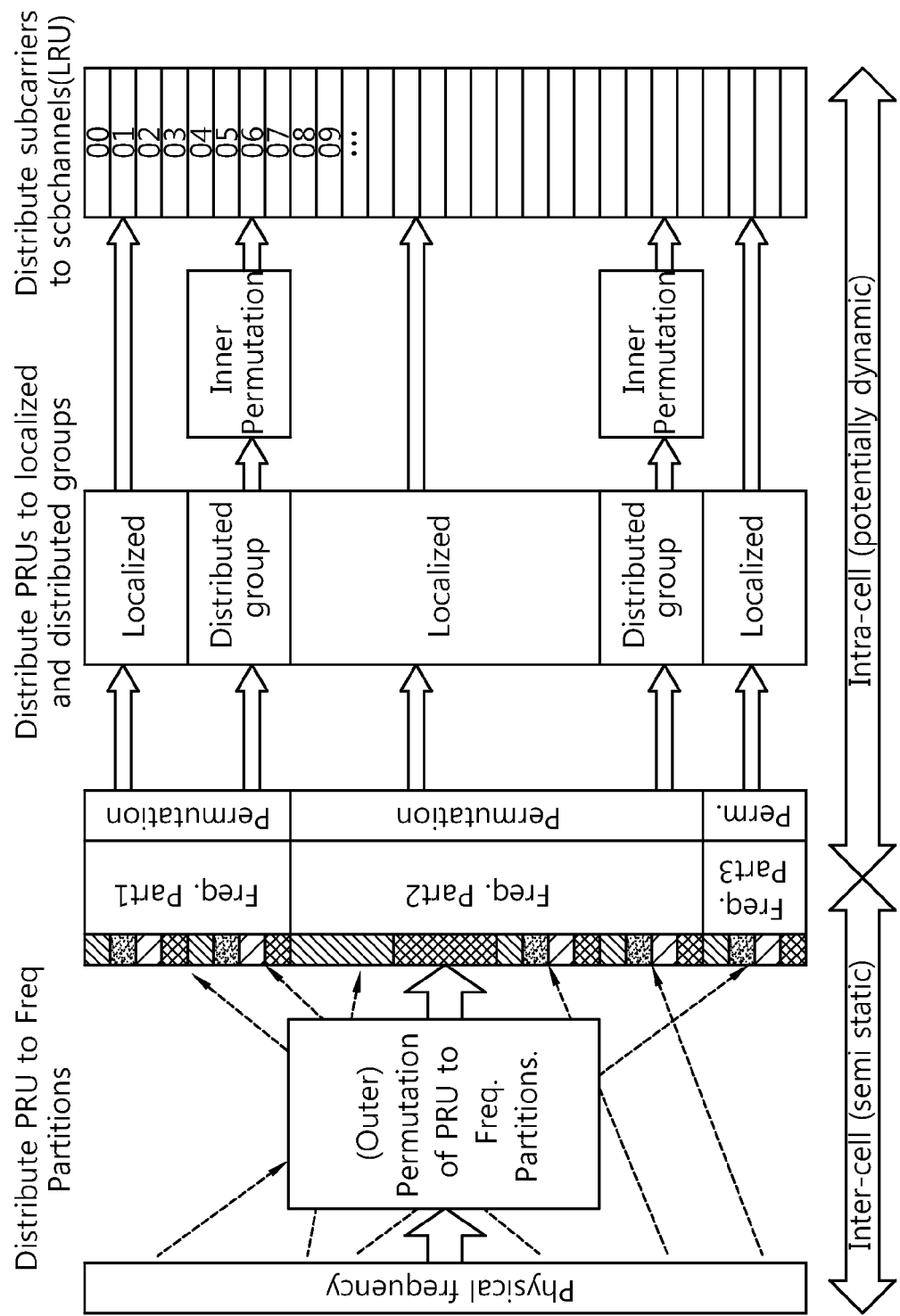
FIG. 6 illustrates an example of a subchannelization process.

1) Performance of DLRU and CLRU
2) Reduction in signaling overhead and CQI (Channel Quality Indicator) overhead
3) Flexibility between distributed resources and local resources
4) Easiness of extension according to bandwidth
5) Simplicity of design of allocation sequence
6) Flexibility according to FFR constitution FIG. 6 illustrates an example of a subchannelization process.

Referring to FIG. 6, subchannelization undergoes the following processes.

1) Outer permutation is performed on a PRU. Outer permutation refers to matching a PRU and each frequency partition. Outer permutation is applied by one or more PRU units (granularity). Outer permutation may be performed by $N_1$ or $N_2$ number of PRUs (here, $N_1 > N_2$), and $N_1$ and $N_2$ may change according to bandwidth. In this case, however, $N_1$ needs to be integral multiple of $N_2$ for an effective outer permutation. Outer permutation may refer to a process of dividing a PRU into a subband (SB) PRU ($PRU_{SB}$) and a miniband (MB) PRU ($PRU_{MB}$), like subband partitioning and miniband permutation, and performing permutation on the miniband PRU by PRU unit. $PRU_{SB}$ is a PRU to be allocated to a subband, and $PRU_{MB}$ is a PRU to be allocated to a miniband. A subband may include four contiguous PRUs, and a miniband may include one PRU. Because a subband uses contiguous PRUs on frequency, it is suitable for a frequency selective allocation, and a miniband is suitable for a frequency diversity allocation.

The number of subbands having granularity of $N_1$ in the entire radio resources may be $K_{SB}$. When an FFR is considered, information regarding $K_{SB}$ may have the same value between cells. In this case, the information regarding the $K_{SB}$ may be shared through signaling between cells, or a value may be previously determined according to bandwidth. Also, in performing outer permutation, same radio resources may be allocated to cells when the FFR is considered, or different radio resources may be allocated to cells when the FFR is not considered. The information regarding the $K_{SB}$ may be broadcast from a BS to a UE, and in this case, the information regarding the $K_{SB}$ may be transmitted through a broadcast channel (BCH) or an SFH (Superframe Header).

2) Rearranged PRUs are distributed to one or more frequency partitions. This process may be included in the outer permutation of 1), which, thus, can be omitted, or may be performed by broadcast frequency partition information. One frequency partition includes all the granularities of $N_1$ and $N_2$, and a reuse region may have the same meaning as that of frequency partition. Or, one frequency partition may include only one granularity, and each reuse region may include a plurality of frequency partitions having different granularities of $N_1$ and $N_2$.

3) The frequency partition is divided into a CRU and a DRU with respect to each resource. In this case, the frequency partition may be divided by granularity unit of $N_1$ and $N_2$. Namely, when each of the frequency partitions includes one granularity, each frequency partition may be divided, or when each of the frequency partitions includes different granularities, each of the frequency partitions may be divided by granularity units. Also, a sector specific permutation may be supported, and direct mapping of resources may be supported for contiguous resources. The size of the distributed/contiguous resources may be flexibly set by sector.

4) A contiguous group and a distributed group are mapped to an LRU.

Inner permutation (or subcarrier permutation) defined for a distributed resource allocation in one frequency partition makes subcarriers of a distributed resource unit of the entire distributed resource spread. The inner permutation may be performed on the basis of subcarriers or tiles. Granularity of the inner permutation is the same as a minimum unit for forming a distributed resource unit. Subchannelization for distributed resources makes subcarriers of an LRU of the entire distributed resources spread.

There is no inner permutation for a contiguous resource allocation. A PRU is directly mapped to a contiguous resource unit in each of frequency partitions.

A BS can provide six downlink MIMO (Multi-Input Multi-Output) modes as shown in Table 1 below:

TABLE 1

| Mode Index | Description | MIMO encoding format (MEF) | MIMO precoding |
|---|---|---|---|
| Mode 0 | OL SU-MIMO (Tx diversity) | SFBC | Non-adaptive |
| Mode 1 | OL SU-MIMO (Spatial Multiplexing, SM) | VE | Non-adaptive |
| Mode 2 | CL SU-MIMO (SM) | VE | adaptive |
| Mode 3 | OL MU-MIMO (SM) | ME | Non-adaptive |
| Mode 4 | CL SU-MIMO (SM) | ME | adaptive |
| Mode 5 | OL SU-MIMO (Tx diversity) | CDR | Non-adaptive |

In Table 1,
'OL' refers to an open loop, and
'CL' refers to a closed loop.
SU refers to a single UE and MU refers to multiple UEs.
As represented in Table 1, modes 0, 1, 3, and 5, among the modes, correspond to OL MIMO.

The BS may set an OL region in relation to an OL MIMO transmission. The OL region is defined as a time-frequency resource using same number of pilot pattern and a given OL MIMO mode. The OL region allows base stations to coordinate their OL MIMO transmission, in order to offer a stable interference environment where the precoders and number of MIMO streams are not time-varying. As shown in Table 2, there are three types of OL regions.

TABLE 2

| | MaxMt | MIMO mode | MIMO feedback mode | Supported permutation |
|---|---|---|---|---|
| OL Region type 0 | 2 streams | MIMO mode 0 MIMO mode 1 (Mt = 2 streams) | 0 | DRU |
| OL Region type 1 | 1 streams | MIMO mode 5 (Mt = 1 stream) | 1 | Miniband based CRU (diversity allocation) |
| OL Region type 1 | 1 streams | MIMO mode 5 (Mt = 1 stream) | 2 | Subband based CRU (localized allocation) |
| OL Region type 2 | 2 streams | MIMO mode 1 (Mt = 2 streams) MIMO mode 3 (Mt = 2 streams) | 5 | Subband based CRU (localized allocation) |

An OL region type 0 supports permutation using a DRU as a resource unit, and OL region type 1 supports permutation using a CRU based on a miniband or a CRU based on a subband, as a resource unit. Hereinafter, the former will be referred to as an OL region type 1 miniband mode, and the latter will be referred to as an OL region type 1 subband mode, for the sake of convenience. An OL region type 2 supports permutation using a CRU based on a subband, as a resource unit.

To enable the OL region, resource units allocated to the OL region must be aligned across cells. Since subbands can be aligned across cells, so there is no problem for OL region type 1 subband mode and the OL region type 2. However, with the current subchannelization method, it is difficult to align resource units across cells with respect to the OL region type 0 and OL region type 1 miniband modes. The reason is because the cells may have different number of subbands, minibands, or DRUs. Also, even when each cell has the same number of subbands, minibands, or DRUs, the positions of the minibands and the DRUs can be hardly aligned due to a CRU/DRU allocation sequence specific to a sector or a cell applied to the miniband and DRU mapping.

First, the existing CRU/DRU allocation method will now be described. It will be referred to section 15.3.5.3.1 of "Part16: Interface for fixed and mobile broadband wireless access system" in IEEE P802.16m/D2-October 2009.

The number of DRUs of a frequency partition i($FP_i$) is indicated as $L_{DRU,FPi}$. Then, $L_{DRU,FPi}$ can be represented by Equation 1 shown below:

$$L_{DRU,FPi} = FPS_i - L_{CRU,FPi} \text{ for } 0 \leq i < FPCT \quad \text{[Equation 1]}$$

Here, $FPS_i$ indicates the number of PRUs allocated to $FP_i$, and FPCT is the number of frequency partitions.

The method for mapping $PRU_{FPi}$ onto $CRU_{FPi}$ ($0 \leq i \leq FPCT$) can be represented by Equation 2 shown below.

$$CRU_{FPi[j]} = \begin{cases} PRU_{FPi}[j] & 0 \leq j < L_{SB-CRU,FPi} \\ PRU_{FPi}[k + L_{SB-CRU,FPi}], & L_{SB-CRU,FPi} \leq j < L_{CRU,FPi} \end{cases} \quad \text{[Equation 2]}$$

Here, $k = s[j - L_{SB-CRU,FPi}]$, and $L_{SB-CRU,FPi}$ refers to the number of subband CRUs allocated to the frequency partition i.

s[ ] indicates a CRU/DRU allocation sequence defined as represented by Equation 3 shown below:

$$s[j] = \{PermSeq(j) + DL\_PermBase\} \mod (FPS_i - L_{SB-CRU,FPi})$$

$$(0 \leq s[j] \leq FPS_i - L_{SB-CRU,FPi}) \quad \text{[Equation 3]}$$

Here, PermSeq(j) is a permutation sequence having a length of ($FPS_i - L_{SB-CRU,FPi}$) and determined by SEED={IDcell*343} mod $2^{10}$. The permutation sequence is generated according to a random sequence generation algorithm. DL_PermBase is set to preamble 'IDcell'. Here, IDCell may be an ID determined for each cell.

A method of matching $PRU_{FPi}[j]$ to $DRU_{FPi}$ is represented by Equation 4 shown below:

$$DRU_{FPi}[j] = PRU_{FPi}[k + L_{SB-CRU,FPi}], 0 \leq j < L_{DRU,FPi} \quad \text{[Equation 4]}$$

Here, $k = s[j + L_{CRU,FPi} - L_{SB-CRU,FPi}]$. $L_{DRU,FPi}$ is the number of DRUs of the frequency partition i (FPi). As shown in Equation 3, the CRU/DRU allocation sequence is cell-specific (or sector-specific), so an alignment of resource units may be difficult in mapping miniband and DRU mapping.

Hereinafter, a method for aligning resource units of an OL region for OL region type 0 and OL region type 1 miniband modes will now be described.

Figure 7:
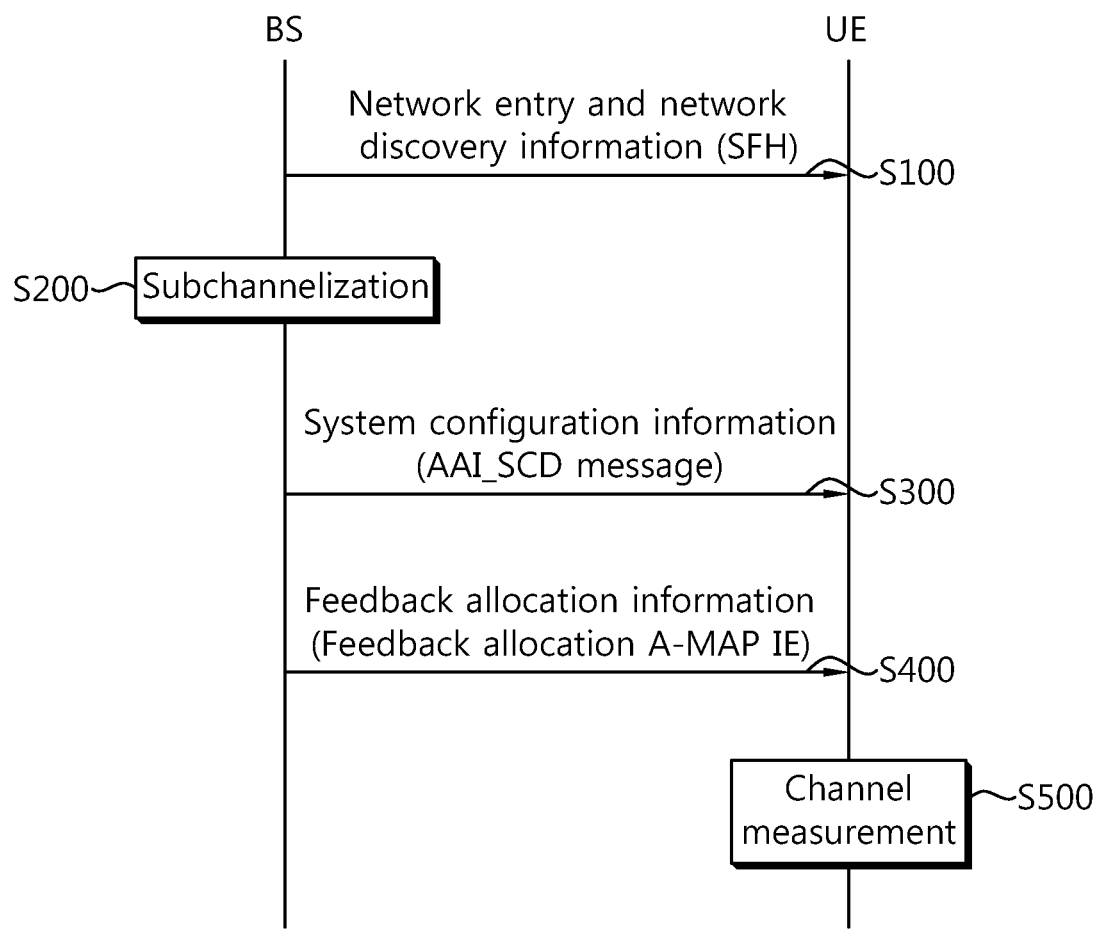
FIG. 7 illustrates a signaling process to perform an open loop (OL) region operation by a user equipment (UE).

FIG. 7 illustrates a signaling process to perform an open loop (OL) region operation by a UE.

Referring FIG. 7, first, a BS transmits initial network entry and network discovery information to a UE (step S100). The network entry and network discovery information may be transmitted via SP2 of the S-SFH. The network entry and network discovery information includes an 'OL region' parameter (See Table 3). Table 3 below shows an example of an S-SFH SP2 IE (Information Element) format.

TABLE 3

| syntax | Size (bits) | Notes |
|---|---|---|
| S-SFH SP2 IE format( ){ | | |
| AAI MAC version | 4 | An unsigned 4-bit quantity equal to the value of the MAC version TLV, minus 10 |
| If(Duplexing mode == FDD) { | | The duplexing mode is obtained from the frame configuration index set in S-SFH SP1 IE |
| UL to DL carrier frequency separation | 6 | |
| UL bandwidth | 3 | The frequency spacing for UL channel is same with DL channel |
| } | | |
| MSB of 48 bit ABS MAC ID | 36 | Remaining bits of ABS MAC ID except LSB of 48 bit ABS MAC ID in S-SFH SP1 |
| Network configuration | 1 | Indicates configuration of the ABS network |
| OL region | 1 | Provides indication about the structure of the MIMO OL region. |
| DSAC | 5/4/3 | Indicate the number of subbands $K_{SB}$<br>For 2048 FFT size, 5 bits<br>For 1024 FFT size, 4 bits<br>For 512 FFT size, 3 bits |
| DFPC | 4/3/3 | Indicate the frequency partition configuration<br>For 2048 FFT size, 4 bits<br>For 1024 FFT size, 3 bits<br>For 512 FFT size, 3 bits |
| DFPSC | 3/2/1 | Indicate the number of subbands allocated to FPi(i > 0)<br>For 2048 FFT size, 3 bits<br>For 1024 FFT size, 2 bits<br>For 512 FFT size, 1 bit |
| USAC | 5/4/3 | Indicate the number of subbands KSB<br>For 2048 FFT size, 5 bits<br>For 1024 FFT size, 4 bits<br>For 512 FFT size, 3 bit<br>For support of wirelessMAN-OFDMA with FDM-based UL PUSC zone, all bits shall be set to zero |
| UFPC | 4/3/3 | Indicate the frequency partition configuration<br>For 2048 FFT size, 4 bits<br>For 1024 FFT size, 3 bits<br>For 512 FFT size, 3 bit<br>For support of wirelessMAN-OFDMA with FDM-based UL PUSC zone, all bits shall be set to zero |

TABLE 3-continued

| syntax | Size (bits) | Notes |
|---|---|---|
| UFPSC | 3/2/1 | Indicate the number of subbands allocated to FPi(i > 0)<br>For 2048 FFT size, 4 bits<br>For 1024 FFT size, 3 bits<br>For 512 FFT size, 3 bit<br>For support of wirelessMAN-OFDMA with FDM-based UL PUSC zone, all bits shall be set to zero |
| AMS transmit power limitation level | 5 | Unsigned 5-bit integer. Specifies the maximum allowed AMS transmit power. Values indicate power levels in 1 dB steps starting from 0 dBm |
| EIRxP$_{IR,min}$ | 5 | Unsigned integer from −133 to −102 in units of 1 dBm, where 0b00000 = −133 dBm and 0b11111 = −102 dBm |
| reserved<br>} | | |

The BS performs subchannelization on an OL region (step S200).

The subchannelization method according to an exemplary embodiment of the present invention can be implemented by changing the existing CRU/DRU allocation method as described above, and various methods (to be described) can be performed.

In a first exemplary embodiment of the present invention, in case of setting the 'OL region' parameter in Table 3 as 1 (namely, in case of enabling OL region), the BS may set the value of the SEED determining Equation 3 as a particular value (e.g., 0).

Figure 8:
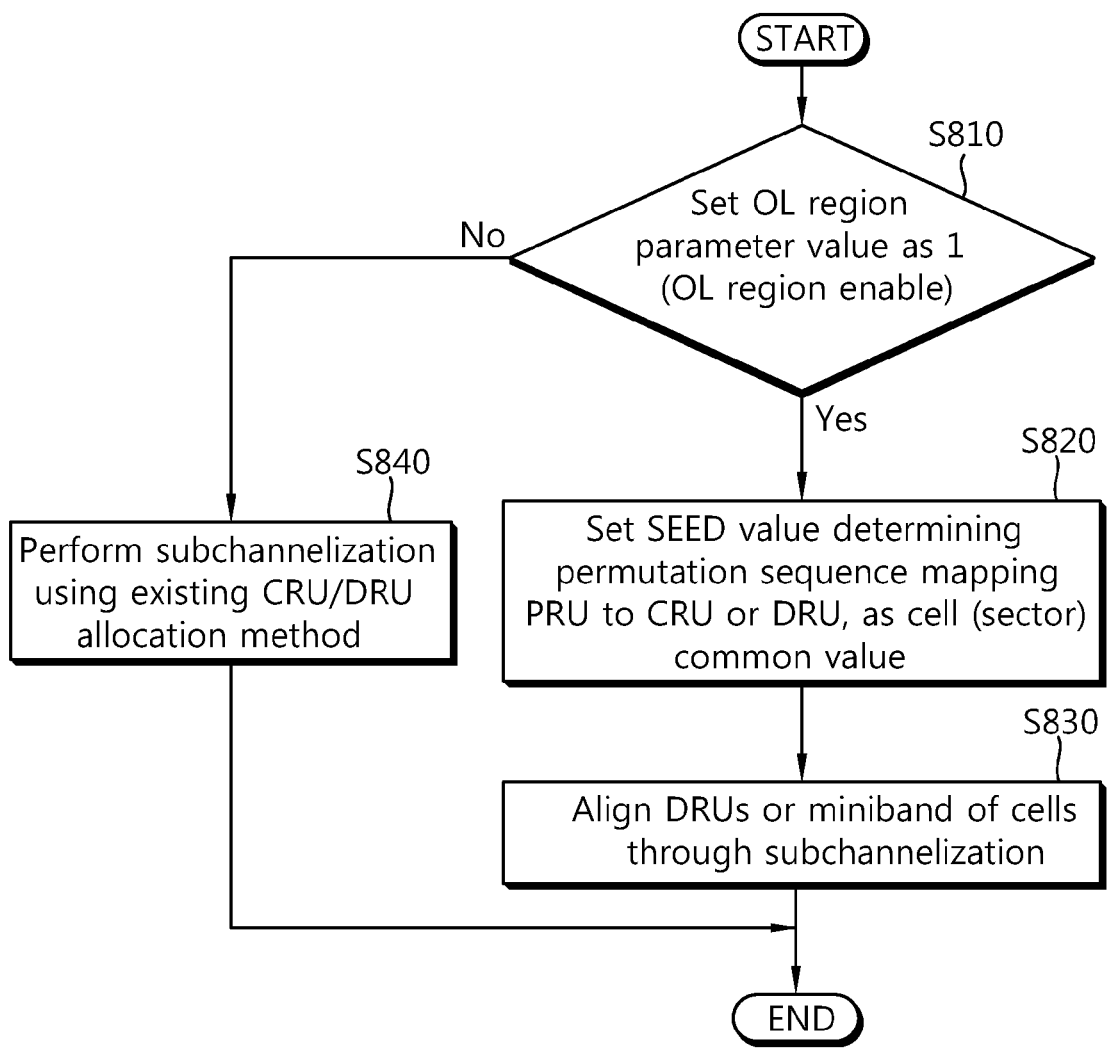
FIG. 8 is a flow chart illustrating an example of a subchannelization process according to a first exemplary embodiment of the present invention.

FIG. 8 is a flow chart illustrating an example of a subchannelization process according to a first exemplary embodiment of the present invention.

The BS determines whether to set the 'OL region' parameter value as a binary number 1 (step S810). When the BS sets the 'OL region' parameter value as 1, the BS sets the SEED value for determining a permutation sequence mapping a PRU to a CRU or a DRU, as a value common to a cell or a sector (step S820). For example, when the BS determines a seed value for determining the permutation sequence of Equation 3, the BS may use an equation such as SEED={PermBase_OLRegion*343} mod $2^{10}$, and in this case, the BS may commonly use a value of 'PermBase_OLRegion' as a particular value such as '0' between cells to set the seed value as the particular value (e.g., 0). In this case, the value of i in the FP$_i$ may be '0'. And in the Equation 3, a value of 'SEED' and a value of 'DL_PermBase' can be a particular value such as '0' for FP$_0$.

Or, the BS may use a value broadcast through a superframe header to set a seed value as a particular value. And, the BS aligns DRUs or minibands of cells through subchannelization using the seed value (step S830). When the BS set the 'OL region' parameter value as a binary value 0, subchannelization may be performed by using the existing CRU/DRU allocation method (step S840) as described above.

Figure 9:
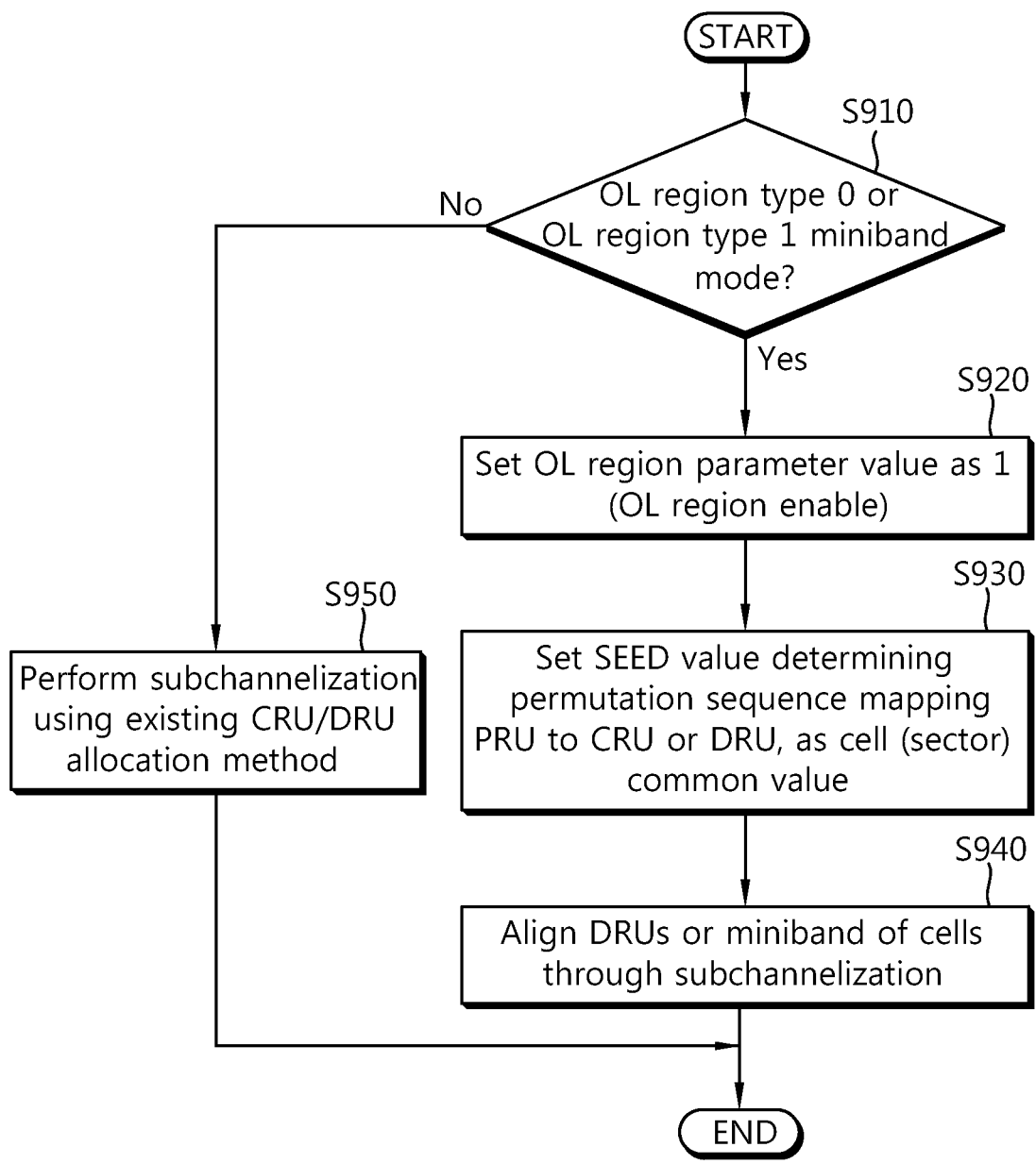
FIG. 9 is a flow chart illustrating another example of a subchannelization process according to the first exemplary embodiment of the present invention.

FIG. 9 is a flow chart illustrating another example of a subchannelization process according to the first exemplary embodiment of the present invention.

The BS determines whether or not an OL region type to be applied is an OL region type 0 or an OL region type 1 miniband mode (step S910). When the OL region type to be applied is the OL region type 0 or an OL region type 1 miniband mode, the BS sets the 'OL region' parameter value of the foregoing Table 3, as a binary number 1 (step S920). Compared with the case of FIG. 8, in the case of FIG. 9, the BS determines the OL region type to be applied, and when the OL region type to be applied is the OL region type 0 or an OL region type 1 miniband mode, the BS sets the 'OL region' parameter, as 1. FIG. 9 shows a detailed example compared with the case of FIG. 8. Namely, the BS may set the 'OL region' parameter as 1 for various reasons, and FIG. 9 shows the case in which when the OL region type is a particular type, the BS sets the 'OL region' parameter as 1. Other processes (S930, S940, S950) have been already described above with reference to FIG. 8.

In the first exemplary embodiment of the present invention, the parameters related to the OL region with respect to the OL region type 0 or the OL region type 1 may be transmitted also through SFH SP1. For example, the BS may signal 1-bit information in SFH SP1, and based on this information, the "PermBase_OLRegion" value of the SEED may be 'IDCell' as shown in the existing Equation 3 or may be a fixed value (e.g., 0).

In a second exemplary embodiment of the present invention, CRU/DRU allocation may be performed as represented by Equation 5 shown below:

$$CRU_{FPi}[j]=PRU_{FPi}[j] \quad 0 \le j < L_{CRU,FPi}$$

$$CRU_{FPi}[j]=PRU_{FPi}[j+L_{SB-CRU,FPi}], 0 \le j < L_{DRU,FPi}$$

In the second exemplary embodiment of the present invention, OL region related parameters with respect to the OL region type 0 or the OL region type 1 may be transmitted via SFH SP1.

In a third exemplary embodiment, CRU allocation of each frequency partition may be performed as represented by Equation 6 shown below:

$$CRU_{FPi}[j] = \begin{cases} PRU_{FPi}[j], \\ 0 \le j < L_{SB-CRU,FPi} \\ PRU_{FPi}[k + L_{SB-CRU,FPi} + L_{MB-CRU,FPi,OLRegion}], \\ L_{SB-CRU,FPi} + L_{MB-CRU,FPi,OLRegion} \le j < L_{CRU,FPi} \end{cases}$$
[Equation 6]

Here, k=s[j−L$_{SB-CRU,FPi}$−L$_{MB-CRU,FPi,OL\ Region}$]

Also, s[ ] is the same as that of Equation 3, and the difference is that the range of s[ ] is 0≤s[j]≤FPS$_i$−L$_{SB-CRU,FPi}$−L$_{MB-CRU,FPi,OLRegion}$.

Also, the miniband CRU of the frequency partition i may be determined as represented by Equation 7 shown below:

$$MB\_CRU_{FPi,OLRegion}[j]=PRU_{FPi}[j],$$

$$L_{SB-CRU,FPi} \le j < L_{SB-CRU,FPi} + L_{MB-CRU,FPi,OLRegion}$$

Here, L$_{MB-CRU,FPi,OLRegion}$ is the number of PRUs allocated for the OL region to the frequency partition i(FP$_i$)

(which is the same hereinafter). The third exemplary embodiment of the present invention may be applied to the OL region type 1 miniband mode or the OL region type 1 miniband mode and subband mix mode.

In a fourth exemplary embodiment of the present invention, the CRU of the frequency partition i may be determined as represented by Equation 8 shown below:

$$CRU_{FPi}[j] = \begin{cases} PRU_{FPi}[j], \\ 0 \leq j < L_{SB-CRU,FPi} + L_{MB-CRU,FPi,OLRegion} \\ PRU_{FPi}[k + L_{SB-CRU,FPi} + L_{MB-CRU,FPi,OLRegion}], \\ L_{SB-CRU,FPi} + L_{MB-CRU,FPi,OLRegion} \leq j < L_{CRU,FPi} \end{cases}$$ [Equation 8]

Here, $k = s[j - L_{SB-CRU,FPi} - L_{MB-CRU,FPi,OLRegion}]$.

Here, s[ ] is the same as that of Equation 3, and the difference is that the range of s[ ] is $0 \leq s[j] \leq FPS_i - L_{SB-CRU,FPi} - L_{MB-CRU,FPi,OLRegion}$.

Also, the miniband CRU of the frequency partition i may be determined as represented by Equation 9 shown below:

$$MB\_CRU_{FPi,OLRegion}[j] = CRU_{FPi}[j],$$

$$L_{SB-CRU,FPi} \leq j < L_{SB-CRU,FPi} + L_{SB-CRU,FPi,OLRegion}$$ [Equation 9]

In a fifth exemplary embodiment of the present invention, the CRU of the frequency partition i may be determined as represented by Equation 10 shown below:

$$CRU_{FPi}[j] = \begin{cases} PRU_{FPi}[j], \\ 0 \leq j < L_{SB-CRU,FPi} \\ PRU_{FPi}[k + L_{SB-CRU,FPi}], \\ L_{SB-CRU,FPi} \leq j < L_{CRU,FPi} - L_{MB-CRU,FPi,OLRegion} \end{cases}$$ [Equation 10]

Where $k = s[j - L_{SB-CRU,FPi}]$

Here, s[ ] is the same as that of Equation 3, and the difference is that the range of s[ ] is $0 \leq s[j] \leq FPS_i - L_{SB-CRU,FPi} - L_{MB-CRU,FPi,OLRegion}$.

Also, the miniband CRU of the frequency partition i may be determined as represented by Equation 11 shown below:

$$MB\_CRU_{FPi,OLRegion}[j] = PRU_{FPi}[j],$$

$$FPS_i - L_{B-CRU,FPi,OLRegion} \leq j < FPS_i$$ [Equation 11]

The fifth exemplary embodiment can be applicable to the OL region type 1 miniband mode.

In a sixth exemplary embodiment of the present invention, the CRU of the frequency partition i may be determined as represented by Equation 12 shown below:

$$CRU_{FPi}[j] = \begin{cases} PRU_{FPi}[j], \\ 0 \leq j < L_{SB-CRU,FPi} \\ PRU_{FPi}[k + L_{SB-CRU,FPi}], \\ L_{SB-CRU,FPi} \leq j < L_{CRU,FPi} \end{cases}$$ [Equation 12]

Where $k = s[j - L_{SB-CRU,FPi}]$

Here, s[ ] is the same as that of Equation 3, and the difference is that the range of s[ ] is $0 \leq s[j] \leq FPS_i - L_{SB-CRU,FPi} - L_{DRU,FPi,OLRegion}$. $L_{DRU,FPi,OLRegion}$ is the number of PRUs (or DRUs) allocated for the OL region to the frequency partition i (FPi). Also, the DRU of the frequency partition i may be determined as represented by Equation 13 shown below:

$$DRU_{FPi}[j] = PRU_{FPi}[k + L_{SB-CRU,FPi}],$$

$$0 \leq j < L_{DRU,FPi} - L_{DRU,FPi,OLRegion}$$

$$DRU_{FPi,OLRegion}[j] = PRU_{FPi}[j],$$

$$FPS_i - L_{DRU,FPi,OLRegion} \leq j < FPS_i$$

The sixth exemplary embodiment can be applicable to the OL region type 0 mode.

With reference back to FIG. 7, the BS transmits system configuration information including parameters with respect to the OL region (step S300). The system configuration information may be transmitted via, for example, an AAI_SCD (system configuration descriptor) message.

Table 4 below illustrates a portion of the AAI_SCD message.

TABLE 4

| Attributes/array of attributes | Size (bits) | Value/Note | Condition |
|---|---|---|---|
| Change configuration Change | 4 | The value is increased whenever the contents of this message is changed. The value rolls over from 0 to 15 | N.A. |
| BS_Restart_Count | 4 | The value is incremented by one whenever BS restarts. The value roll over from 0 to 15 | N.A. |
| SA_preamblePartitionforBStype | | Indicates the SA-preamble partition information | M |
| Trigger difinitions NormalizedCINR | Variable | | N.A. |
| OL_MIMO_Parameters | 1 | 0 or 1 | OL MIMO parameter |
| OL_MIMO_Parameters | 4 | 0 to 15 | OL MIMO Parameter |
| OL_MIMO_Parameters | 4 | 0 to 15 | OL MIMO Parameter |
| OL_MIMO_Parameters | 4 | 0-15 | OL MIMO parameter |

As noted in Table 4, the BS may inform the UE about parameters regarding the OL region through the AAI_SCD message. For example, the BS may inform the UE about whether or not the OL region type 0 is ON or OFF. Or, the BS may inform the UE about the size of an NLRU (miniband LRU). Or the BS may inform the UE about the size of a SLRU (subband LRU).

The BS transmits a feedback allocation A-MAP IE to the UE (step S400). The A-MAP IE (Advanced-MAP Information Element) may be defined as a basic element of controlling a unicast service.

A feedback allocation A-MAP IE for a dynamic allocation or release of a feedback channel, among a plurality of A-MAP IEs, may be transmitted to the UE. A feedback channel to be allocated or released by the feedback allocation A-MAP IE includes a PFBCH and an SFBCH. In a state in which the UE has an already allocated feedback channel with respect to a downlink carrier, when a new feedback channel is allocated again, the existing feedback channel may be automatically released.

Table 5 below shows an example of the feedback allocation A-MAP IE for allocating a feedback channel.

TABLE 5

| Syntax | Size in bits | Description/Notes |
|---|---|---|
| Feedback-Allocation-MAP_IE( ) { | — | — |
| A-MAP IE Type | [4] | Feedback Allocation A-MAP IE = 0b0010 |
| Channel Index | Variable | Feedback channel index within the UL fast feedback control resource region |
| Short-term Feedback Period (p) | [3] | A feedback is transmitted on the FBCH every $2^p$ frames |
| Long-term Feedback Period (q) | [2] | A long-term feedback is transmitted on the FBCH every $2^q$ short-term feedback opportunity. If q = 0b00, long-term feedback is not used. |
| Frame offset | [3] | The AMS starts reporting at the frame of which the number has the same 3 LSB as the specified frame offset. If the current frame is specified, the AMS should start reporting in eight frames |
| Allocation Duration(d) | [3] | A FBCH is transmitted on the FBCH channels indexed by Channel Index for $8*2^d$ frames. If d = 0b000, the FBCH is deallocated. If d = 0b111, the AMS should report until the ABS command for the AMS to stop. |
| ACK Allocation Flag | [1] | Indicate if one ACK channel is allocated |
| If (ACK Allocation Flag == 0b1){ | | |
| HFA | [3] | HARQ feedback channel allocation for Feedback Channel De-allocation confirmation |
| } | | |
| MaxMt | Variable [1-2] | Variable number of bits-depends on number of transmit antenna Nt<br>If Nt = 2 (SU-MIMO and MU-MIMO):<br>0b0: 1, 0b1: 2<br>If Nt = 4 (SU-MIMO and MU-MIMO):<br>0b00: 1, 0b01: 2, 0b10: 3, 0b11: 4<br>If Nt = 8 (SU-MIMO):<br>0b000: 1, 0b001: 2, 0b011: 4, 0b111: 8<br>If Nt = 8 ÷ (MU-MIMO):<br>0b00: 1, 0b01: 2, 0b10: 3, 0b11: 4 |
| MFM | [3] | MIMO Feedback Mode as defined in Table 691 |
| If (MFM = 2, 3, 5, 6) { | | |
| Feedback Format | [2] | |
| }<br>If(MFM=0,1,4,7){ | | |
| FPI | [2] | Frequency partition indication: ABS indicate AMS to send wideband CQI and STC rate of the frequency partition and reuse factor in the future:<br>0b00: Frequency partition index 0<br>0b01: Frequency partition index 1<br>0b10: Frequency partition index 2<br>0b11: Frequency partition index 3 |
| }<br>If (MFM = 0,1 & Long-term Feedback Period != 0b00)<br>{ | | |
| Long term FPI | [2] | Frequency partition indication: ABS indicate AMS to send wideband CQI and STC rate for the second frequency partition using long term feedback:<br>0b00: Frequency partition index 0<br>0b01: Frequency partition index 1<br>0b10: Frequency partition index 2<br>0b11: Frequency partition index 3 |
| }<br>If (MFM == 3,4,6,7) { | | CL SU and MU MIMO |
| CM | [2] | Codebook Feedback Mode and Codebook Coordination Enable |

TABLE 5-continued

| Syntax | Size in bits | Description/Notes |
|---|---|---|
| | | 0b00: standard with CCE disabled |
| | | 0b01: adaptive with CCE disabled |
| | | 0b10: differential with CCE disabled |
| | | 0b11: standard with CCE enabled |
| CS | [1] | Codebook subset |
| } | | |
| If(MFM=0, 1, 5){ | | |
| Measurement Method Indication | [1] | 0b0: Use the midamble for CQI measurements |
| | | 0b1: Use pilots in OL region with MaxMt streams for CQI measurements |
| } | | |
| Padding | Variable | Padding to reach byte boundary |
| MCRC | [16] | 16 bit CRC masked by Station ID |
| } | — | — |

The respective fields constituting the feedback allocation A-MAP IE of Table 5 are defined as follows.

Channel index: It defines an index of an uplink resource of a feedback channel through which the UE transmits feedback information. In this case, a one-to-one corresponding relationship is formed between the corresponding UE and the channel index. Namely, a feedback channel allocated to each UE does not overlap.

Short-term feedback period: It defines a period at which short-term feedback information, which is relatively frequently changed according to a channel environment, among feedback information, is transmitted. The short-term feedback information may include a CQI, a PMI (Precoding Matrix Indicator), and the like. The short-term feedback information is transmitted at every $2^p$ frames according to the short-term feedback period.

Long-term feedback period: It defines a period at which long-term feedback information, which is not frequently changed, among the feedback information, is transmitted. The long-term feedback information may include a subband index, a MIMO feedback mode, and the like. The long-term feedback information is transmitted at every $2^q$ frames according to the long-term feedback information, and when q=0, the long-term feedback information is not transmitted.

Allocation duration: It defines an allocation period of a feedback channel. When a field value indicating an allocation duration is d, a feedback channel by $8*2^d$ frames is allocated. When d=0b000, the feedback channel is released, and when d=0b111, the feedback channel continues to exist until such time as a release command is received from the BS.

ACK allocation flag: It is a field for an allocation of an ACK channel via which a message for acknowledging a release of a feedback channel is transmitted. When d=0b000 (d indicates the allocation duration), the value of the ACK allocation flag is 0b1, and when d is not '0b000', if a channel index of a newly allocated feedback channel is identical to that of a released feedback channel, the value of the ACK allocation flag is set to be 0b1.

MFM: It defines a MIMO feedback mode

Feedback format: It defines a feedback format index when feedback information is transmitted via a feedback channel, and may indicate the type of transmitted feedback information, and the like. Feedback formats according to different MIMO feedback modes may be defined.

FPI (Frequency Partition Indication): It indicates information of a frequency partition measuring feedback information to be transmitted according to the short-term feedback period. When the number of the frequency partition is one, the FPI field may not exist.

Long term FPI: It indicates information of another frequency partition measuring feedback information to be transmitted according to the long-term feedback period. When the number of the frequency partition is one, the long term FPI field does not exist, and when the number of the frequency partitions is two, they are implicitly signaled by the FPI field.

MaxMt: It indicates a maximum number of ranks or a maximum number of scheduled users according to a feedback mode.

CM (Codebook Mode): It indicates a codebook feedback mode.

Measurement method indication: It indicates a midamble or pilot for a CQI measurement.

The UE measures a channel with the BS (step S500). When the value of the 'measurement method indication' is 1, the UE performs a CQI measurement by using the pilot of an OL region, and when the value of the 'measurement method indication' is 0, the UE performs a CQI measurement by using a midamble. Thereafter, the UE can transmit feedback information through the OL region to the BS.

According to exemplary embodiments of the present invention, resources units of an open loop (OL) region can be aligned even in an OL region type 0 and OL region type 1 miniband mode.

Figure 10:
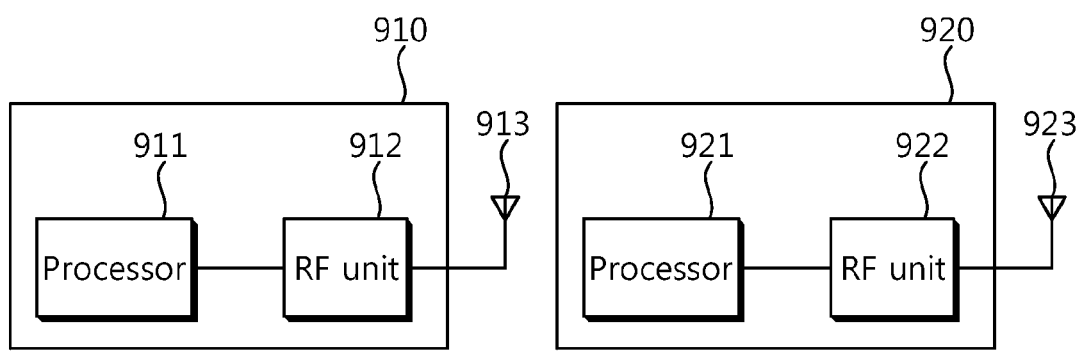
FIG. 10 is a schematic block diagram of a user equipment (UE) according to an exemplary embodiment of the present invention.

FIG. 10 is a schematic block diagram of a BS and a UE according to an exemplary embodiment of the present invention.

A BS 910 includes a processor 911 and an RF unit 912. The processor 911 implements a proposed function, process, and/or method. For example, the processor 911 transmits a network entry and network discovery information including an 'open loop (OL) region' parameter. And the processor 911 maps a physical resource unit (PRU) to a contiguous resource unit (CRU) or a distributed resource unit (DRU) with respect to $i^{th}$ frequency partition ($FP_i$) based on the 'OL region' parameter. In this case, the value of i in the $FP_i$ can be a '0'. And a permutation sequence used for mapping a PRU of the $i^{th}$ frequency partition ($PRU_{FPi}$) to a CRU of the $i^{th}$ frequency partition ($CRU_{FPi}$) or a DRU of the $i^{th}$ frequency partition ($DRU_{FPi}$) is determined by a seed value, and the seed value is set to be a particular value according to the value of the 'OL region' parameter. RF unit 912 is connected to the processor 911 and RF unit 912 transmits or receives a radio signal via antenna 913.

A UE 920 includes a processor 921 and an RF unit 922. The processor 921 implements a proposed function, process, and/or method. For example, the processor 921 receives a network entry and network discovery information including an 'open loop (OL) region' parameter. And the processor 921 receives a downlink signal using a mapping relation which maps a physical resource unit (PRU) to a contiguous resource unit (CRU) or a distributed resource unit (DRU) with respect to $i^{th}$ frequency partition ($FP_i$) based on the 'OL region' parameter. As described above, in this case, the value of i in the $FP_i$ can be a '0' and a permutation sequence used for mapping a PRU of the $i^{th}$ frequency partition ($PRU_{FPi}$) to a CRU of the $i^{th}$ frequency partition ($CRU_{FPi}$) or a DRU of the $i^{th}$ frequency partition ($DRU_{FPi}$) is determined by a seed value, and the seed value is set to be a particular value according to the value of the 'OL region' parameter. RF unit 922 is connected to the processor 921 and RF unit 922 transmits or receives a radio signal via antenna 923.

The processor 911, 921 may include an ASIC (Application-Specific Integrated Circuit), a chip set, and/or a logical circuit and/or data processing device. The RF unit 912, 922 may include a baseband circuit for processing a radio signal. When the embodiment is implemented by software, the foregoing scheme may be implemented by a module (process, function, etc.) perform the foregoing function. The module may be executed by the processor 911, 921.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A method of downlink subchannelization in a wireless communication system, the method performed by a base station and comprising:
   transmitting initial network entry and network discovery information including an open loop (OL) region parameter that has a 1-bit size and provides an indication related to a structure of an OL region; and
   mapping a physical resource unit (PRU) of an $i^{th}$ frequency ($PRU_{FPi}$) to either a contiguous resource unit (CRU) of the $i^{th}$ frequency partition ($CRU_{FPi}$) or a distributed resource unit (DRU) of the $i^{th}$ frequency partition ($DRU_{FPi}$) based on the OL region parameter,
   wherein "i" is 0 or a natural number, and
   wherein a permutation sequence used for the mapping is determined by a seed value, the seed value set to 0 when a value of the OL region parameter is 1.

2. The method of claim 1, wherein the initial network entry and network discovery information is transmitted via a superframe header.

3. The method of claim 1, wherein $CRU_{FPi}$ is determined by the following equation:

$$CRU_{FPi[j]} = \begin{cases} PRU_{FPi}[j] & 0 \leq j < L_{SB-CRU,FPi} \\ PRU_{FPi}[k + L_{SB-CRU,FPi}], & L_{SB-CRU,FPi} \leq j < L_{CRU,FPi}, \end{cases}$$

wherein j is zero or a natural number,
wherein k is $s[j-L_{SB-CRU,FPi}]$,
wherein $L_{SB-CRU,FPi}$ is a number of subband CRUs allocated to the $i^{th}$ frequency partition, and
wherein $L_{CRU,FPi}$ is the number of CRUs of the $i^{th}$ frequency partition.

4. The method of claim 3, wherein s[j] is a sequence defined by the following equation:

$$s[j] = \{PermSeq(j) + DL\_PermBase\} \bmod(FPS_i - L_{SB-CRU,FPi})$$

$$(0 \leq s[j] \leq FPS_i - L_{SB-CRU,FPi})$$

wherein PermSeq(j) is a permutation sequence having a length of ($FPS_i - L_{SB-CRU,FPi}$) and is determined by the seed value,
wherein DL_PermBase is set as a cell identifier (ID) of a preamble, and
wherein $FPS_i$ is a number of PRUs allocated to the $i^{th}$ frequency partition.

5. The method of claim 4, wherein both the seed value and 'DL_PermBase' in a $0^{th}$ frequency partition are set to 0 when the value of the OL region parameter is 1.

6. The method of claim 1, wherein $DRU_{FPi}$ is determined by the following equation:

$$DRU_{FPi[j]} = PRU_{FPi}[k + L_{SB-CRU,FPi}], 0 \leq j < L_{DRU,FPi},$$

wherein j is zero or a natural number,
wherein $k = s[j + L_{CRU,FPi} - L_{SB-CRU,FPi}]$,
wherein $L_{DRU,FPi}$ is a number of DRUs of the $i^{th}$ frequency partition, and
wherein $L_{CRU,FPi}$ is a number of CRUs of the $i^{th}$ frequency partition.

7. The method of claim 1, further comprising:
   transmitting system configuration information including information related to a type of the OL region or information related to a size of a resource unit applied to the type of the OL region.

8. The method of claim 7, wherein the seed value is set to a particular value only when the type of the OL region is an OL region using the DRU or a miniband as a resource unit of permutation.

9. The method of claim 7, further comprising:
   transmitting feedback allocation information including a measurement method indicator and a reference signal used for a Channel Quality Indicator (CQI) measurement by a terminal, the terminal determined according to a value of the measurement method indicator.

10. A method of receiving a signal using downlink subchannelization in a wireless communication system, the method performed by a user equipment(UE) and comprising:
    receiving initial network entry and network discovery information including an open loop (OL) region parameter that has a 1-bit size and provides an indication related to a structure of an OL region; and
    receiving a downlink signal via a contiguous resource unit (CRU) of an $i^{th}$ frequency partition ($CRU_{FPi}$) or a distributed resource unit (DRU) of the $i^{th}$ frequency partition ($DRU_{FPi}$), the CRU or the DRU mapped from a physical resource unit (PRU) of the $i^{th}$ frequency partition ($PRU_{FPi}$) based on the OL region parameter,
wherein "i" is 0 or a natural number, and
wherein a permutation sequence used for the mapping is determined by a seed value, the seed value set to 0 when a value of the OL region parameter is 1.

11. The method of claim 10, wherein the initial network entry and network discovery information is received via a superframe header.

12. The method of claim 10, wherein $CRU_{FPi}$ is determined by the following equation:

$$CRU_{FPi[j]} = \begin{cases} PRU_{FPi}[j] & 0 \leq j < L_{SB-CRU,FPi} \\ PRU_{FPi}[k + L_{SB-CRU,FPi}], & L_{SB-CRU,FPi} \leq j < L_{CRU,FPi}, \end{cases}$$

wherein j is zero or a natural number,
wherein k is $s[j-L_{SB-CRU,FPi}]$,
wherein $L_{SB-CRU,FPi}$ is a number of subband CRUs allocated to the $i^{th}$ frequency partition, and
wherein $L_{SB-CRU-FPi}$ is the number of CRUs of the $i^{th}$ frequency partition.

13. The method of claim 12, wherein s[j] is a sequence defined by the following equation:

$$s[j]=\{PermSeq(j)+DL\_PermBase\} \bmod (FPS_i - L_{SB-CRU,FPi})$$

$$(0 \leq s[j] \leq FPS_i - L_{SB-CRU,FPi})$$

wherein PermSeq(j) is a permutation sequence having a length of (FPSi-LSB-CRU,FPi) and is determined by the seed value,
wherein DL_PermBase is set as a cell ID of a preamble, and
wherein FPSi is a number of PRUs allocated to the ith frequency partition.

14. The method of claim 13, wherein both the seed value and 'DL_PermBase' in a $0^{th}$ frequency partition are set to 0 when the value of the OL region parameter is 1.

15. The method of claim 10, wherein $DRU_{FPi}$ is determined by the following equation:

$$DRU_{FPi}[j]=PRU_{FPi}[k+L_{SB-CRU,FPi}], 0 \leq j < L_{DRU,Fpi},$$

wherein j is zero or a natural number,
wherein $k=s[j+L_{CRU,FPi}-L_{SB-CRU-FPi}]$,
wherein $L_{DRU,FPi}$ is a number of DRUs of the $i^{th}$ frequency partition, and
wherein $L_{CRU,FPi}$ is a number of CRUs of the $i^{th}$ frequency partition.

16. The method of claim 10, further comprising:
receiving system configuration information including information related to a type of the OL region or information related to a size of a resource unit applied to the type of the OL region.

17. The method of claim 16, wherein the seed value is set to a particular value when the type of the OL region is an OL region using the DRU or a miniband as a resource unit of permutation.

18. The method of claim 16, further comprising:
receiving feedback allocation information including a measurement method indicator and a reference signal used for a Channel Quality Indicator (CQI) measurement by a terminal, the terminal determined according to a value of the measurement method indicator.

19. A user equipment (UE) of a wireless communication system, the UE comprising:
a memory;
a radio frequency (RF) unit; and
a processor connected to the memory and the RF unit,
wherein the processor receives initial network entry and network discovery information including an open loop (OL) region parameter that has a 1-bit size and provides an indication related to a structure of an OL region and receives a downlink signal via a contiguous resource unit (CRU) of an $i^{th}$ frequency partition ($CRU_{FPi}$) or a distributed resource unit (DRU) of the $i^{th}$ frequency partition ($DRU_{FPi}$), the CRU or the DRU mapped from a physical resource unit (PRU) of the $i^{th}$ frequency partition ($PRU_{FPi}$) based on the OL region parameter,
wherein "i" is 0 or a natural number, and
wherein a permutation sequence used for the mapping is determined by a seed value, the seed value set to 0 when a value of the OL region parameter is 1.

20. The UE of claim 19, wherein the initial network entry and network discovery information is received via a superframe header.

21. The UE of claim 19, wherein $CRU_{FPi}$ is determined by the following equation:

$$CRU_{FPi[j]} = \begin{cases} PRU_{FPi}[j] & 0 \leq j < L_{SB-CRU,FPi} \\ PRU_{FPi}[k + L_{SB-CRU,FPi}], & L_{SB-CRU,FPi} \leq j < L_{CRU,FPi}, \end{cases}$$

wherein j is zero or a natural number,
wherein k is $s[j-L_{SB-CRU,FPi}]$,
wherein $L_{SB-CRU,FPi}$ is a number of subband CRUs allocated to the ith frequency partition, and
wherein $L_{CRU,FPi}$ is the number of CRUs of the ith frequency partition.

22. The UE of claim 21, wherein s[j] is a sequence defined by the following equation:

$$s[j]=\{PermSeq(j)+DL\_PermBase\} \bmod (FPS_i - L_{SB-CRU,FPi})$$

$$(0 \leq s[j] \leq FPS_i - L_{SB-CRU,FPi}),$$

wherein PermSeq(j) is a permutation sequence having a length of ($FPS_i - L_{SB-CRU,FPi}$) and is determined by the seed value,
wherein DL_PermBase is set as a cell ID of a preamble, and
wherein $FPS_i$ is a number of PRUs allocated to the $i^{th}$ frequency partition.

23. The UE of claim 22, wherein both the seed value and 'DL_PermBase' in a $0^{th}$ frequency partition are set to 0 when the value of the OL region parameter is 1.

24. The UE of claim 19, wherein $DRU_{FPi}$ is determined by the following equation:

$$DRU_{FPi}[j]=PRU_{FPi}[k+L_{SB-CRU,FPi}], 0 \leq j < L_{DRU,FPi},$$

wherein j is zero or a natural number,
wherein $k=s[j+L_{CRU,FPi}-L_{SB-CRU,FPi}]$,
wherein $L_{DRU,FPi}$ is a number of DRUs of the $i^{th}$ frequency partition, and
wherein $L_{CRU,FPi}$ is a number of CRUs of the $i^{th}$ frequency partition.

* * * * *